United States Patent
Zhang

(10) Patent No.: US 9,467,992 B2
(45) Date of Patent: Oct. 11, 2016

(54) METHOD AND SYSTEM FOR ALLOCATING DYNAMIC FRAME STRUCTURE OF TDD SYSTEM, AND EVOLVED NODEB

(75) Inventor: Xiaobo Zhang, Shenzhen (CN)

(73) Assignees: ZTE Corporation, Shenzhen, Guangdong (CN); ZTE Microelectronics Technology Co., Ltd., Shenzhen (CN)

( * ) Notice: Subject to any disclaimer, the term of this patent is extended or adjusted under 35 U.S.C. 154(b) by 19 days.

(21) Appl. No.: 14/377,699

(22) PCT Filed: Jun. 28, 2012

(86) PCT No.: PCT/CN2012/077760
§ 371 (c)(1),
(2), (4) Date: Aug. 8, 2014

(87) PCT Pub. No.: WO2013/117071
PCT Pub. Date: Aug. 15, 2013

(65) Prior Publication Data
US 2015/0016316 A1    Jan. 15, 2015

(30) Foreign Application Priority Data

Feb. 10, 2012    (CN) .......................... 2012 1 0030111

(51) Int. Cl.
*H04W 72/04* (2009.01)
*H04L 5/14* (2006.01)
(Continued)

(52) U.S. Cl.
CPC ......... *H04W 72/042* (2013.01); *H04B 7/2656* (2013.01); *H04L 5/14* (2013.01); *H04W 48/00* (2013.01); *H04W 72/0446* (2013.01)

(58) Field of Classification Search
CPC .... H04L 5/14; H04W 52/14; H04W 52/143; H04W 52/146; H04W 72/0413; H04W 72/042; H04W 72/1289; H04W 72/12884
See application file for complete search history.

(56) References Cited

U.S. PATENT DOCUMENTS

2011/0019776 A1 *  1/2011  Zhang et al. .............. 375/340
2011/0176461 A1    7/2011  Astely
(Continued)

FOREIGN PATENT DOCUMENTS

CN    101400081 A    4/2009
CN    102025411 A    4/2011
(Continued)

OTHER PUBLICATIONS

R1-122363, 3GPP TSG-RAN WG1 Meeting #69, Prague, Czech Republic, May 21-25, 2012, Discussion on Enhancements for Dynamic TDD UL-DL configuration, May 12, 2012. (4 pages—see International Search Report in international application No. PCT/CN2012/077760 for relevant pages).
(Continued)

*Primary Examiner* — Benjamin H Elliott, IV
(74) *Attorney, Agent, or Firm* — Oppedahl Patent Law Firm LLC

(57) ABSTRACT

The present disclosure discloses a method for allocating a dynamic frame structure of a Time Division Duplexing (TDD) LTE system, including the steps that: an Evolved NodeB (eNB) sends a Radio Resource Control (RRC) information of entering a state of dynamically allocating the frame structure to a User Equipment (UE), and sends the configuration information of the frame structure in a Physical Downlink Control Channel (PDCCH); and after receiving the information, the UE detects the configuration information of the frame structure in the PDCCH, and allocates the frame structure to be adopted in the next configuration period according to the detected configuration information. Moreover, the present disclosure may further disclose a system for allocating a dynamic frame structure of a TDD system and an eNB. Through the solution of the present disclosure, the variation period of the frame structure of the TDD system can be shortened and the transmission of asymmetrical service can be supported better.

13 Claims, 3 Drawing Sheets

(51) Int. Cl.
*H04W 48/00* (2009.01)
*H04B 7/26* (2006.01)

(56) References Cited

U.S. PATENT DOCUMENTS

| | | |
|---|---|---|
| 2011/0211503 A1 | 9/2011 | Che et al. |
| 2011/0228719 A1 | 9/2011 | Liu |
| 2011/0235554 A1 | 9/2011 | Chen |
| 2012/0120842 A1 | 5/2012 | Kim |
| 2013/0044651 A1* | 2/2013 | Wang et al. .................. 370/280 |
| 2014/0036859 A1* | 2/2014 | Ekpenyong et al. ......... 370/330 |
| 2014/0204961 A1* | 7/2014 | Hooli et al. .................. 370/476 |
| 2015/0016316 A1* | 1/2015 | Zhang ........................... 370/280 |

FOREIGN PATENT DOCUMENTS

CN 102204154 A 9/2011
WO 2011013989 A2 2/2011

OTHER PUBLICATIONS

R1-120744, 3GPP TSG-RAN WG1 Meeting #68, Dresden, Germany, Feb. 6-10, 2012, Evaluation results for LTD_TDD_eIMTA in isolated cell scenario, Jan. 30, 2012. (7 pages—see International Search Report in international application No. PCT/CN2012/077760 for relevant pages).
International Search Report in international application No. PCT/CN2012/077760, mailed on Nov. 8, 2012. (2 pages—see entire document).
English Translation of the Written Opinion of the International Search Authority in international application No. PCT/CN2012/077760, mailed on Nov. 8, 2012. (5 pages—see entire document).
Supplementary European Search Report in European application No. 12868247.3, mailed on Mar. 23, 2016.

* cited by examiner

METHOD AND SYSTEM FOR ALLOCATING DYNAMIC FRAME STRUCTURE OF TDD SYSTEM, AND EVOLVED NODEB

TECHNICAL FIELD

The present disclosure relates to the field of $3^{rd}$ Generation Partnership Project (3GPP), and more particularly to a method and a system for allocating a dynamic frame structure of a Time Division Duplexing (TDD) system and an Evolved NodeB (eNB).

BACKGROUND

In the Long Term Evolution (LTE) and Long Term Evolution-Advanced (LTE-A) standard, the system frame of the TDD consists of ten sub-frames. The 3GPP supports seven types of frame structures in total. As shown in FIG. 1, D represents a downlink channel sub-frame, S represents a shared channel sub-frame, and U represents an uplink channel sub-frame.

TABLE 1

| Uplink and downlink frame structure number | Period of switch point from downlink to uplink | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the current 3GPP standard, a User Equipment (UE) is notified of the frame structure allocated for the current serving cell through System Information Block Information (SIB-I). In the pre-search project of "dynamic TDD frame structure" formally approved by the 3GPP in the RAN 54th session (December 2011), it becomes more possible to dynamically allocate the frame structure of the TDD system. Whereas, since the minimum variation period of the SIB-I in the current 3GPP standard is 640 ms, the frame structure of the TDD system cannot be allocated dynamically in time. Now, there is not a solution for how to shorten the variation period of the frame structure of the TDD system, and how to notify R11 and a further release UE of the frame structure to be adopted in the next configuration period more dynamically under a condition that the UE is compatible with the 3GPP R8-10.

SUMMARY

In view of the above, the present disclosure provides a method and a system for allocating a dynamic frame structure of a TDD system and an eNB, so as to shorten the variation period of frame structure of the TDD system and support the transmission of an asymmetrical service better.

Therefore, the technical solution of the present disclosure is implemented as follows.

The present disclosure provides a method for allocating a dynamic frame structure of a TDD system, including that:

an eNB sends to a UE a Radio Resource Control (RRC) information of entering a state of dynamically allocating the frame structure, and sends the configuration information of the frame structure in a Physical Downlink Control Channel (PDCCH); and after receiving the RRC information, the UE detects the configuration information of the frame structure in the PDCCH, and configures the frame structure to be adopted in the next configuration period according to the detected configuration information.

In the solution, the RRC information is System Information Block (SIB) information broadcast signaling or a RRC information dedicated to the UE; and the SIB information broadcast signaling or the RRC information dedicated to the UE carries an identifier or information of entering the state of dynamically allocating the frame structure predetermined by the eNB and the UE.

In the solution, the step that the eNB sends the configuration information of the frame structure in the PDCCH includes that: the eNB reuses a Downlink Control Information (DCI) information bit and sets the configuration information of the frame structure at the reused DCI information bit.

In the solution, the step that the eNB sends the configuration information of the frame structure in the PDCCH includes that: the eNB redefines a DCI information bit and sets the configuration information of the frame structure at the redefined DCI information bit.

In the solution, the PDCCH for sending the configuration information of the frame structure is located in a predefined downlink sub-frame.

In the solution, the reused DCI information bit is a reused Uplink Index (ULI) bit or a Downlink Allocation Indicator (DAI) bit.

The present disclosure provides a system for allocating a dynamic frame structure of a Time Division Duplexing (TDD) system, comprising an Evolved NodeB (eNB) and a User Equipment (UE), wherein the eNB is configured to send to the UE a Radio Resource Control (RRC) information of entering the state of dynamically allocating the frame structure, and send the configuration information of the frame structure in a Physical Downlink Control Channel (PDCCH); and the UE is configured to, after receiving the RRC information, detect the configuration information of the frame structure in the PDCCH, and allocate the frame structure to be adopted in the next configuration period according to the detected configuration information.

In the solution, the eNB includes: a state notification module and a configuration module, wherein the state notification module is configured to send to the UE an RRC information of entering the state of dynamically allocating the frame structure; and the configuration module is configured to send the configuration information of the frame structure in the PDCCH.

In the solution, the configuration module is specifically configured to reuse a DCI information bit and set the configuration information of the frame structure in the reused DCI information bit.

The present disclosure provides an eNB, including: a state notification module and a configuration module, wherein the state notification module is configured to send an RRC information of entering the state of dynamically allocating the frame structure to a UE; and the configuration module is configured to send the configuration information of the frame structure in a PDCCH.

Through the method and the system for allocating the dynamic frame structure of the TDD system and the eNB provided by the present disclosure, the eNB sends to the UE an RRC protocol information of entering the state of dynamically allocating the frame structure, and sends the configuration information of the frame structure in the PDCCH; and the UE, after receiving the information, detects the configuration information of the frame structure in the PDCCH, and allocates the frame structure to be adopted in the next configuration period according to the detected configuration information. Therefore, the variation period of frame structure of the TDD system can be shortened, and the transmission of an asymmetrical service is supported better.

DETAILED DESCRIPTION

In the present disclosure, an eNB sends to a UE an RRC information of entering the state of dynamically allocating the frame structure, and sends the configuration information of the frame structure in a PDCCH; and the UE, after receiving the RRC information, detects the configuration information of the frame structure in the PDCCH, and allocates the frame structure to be adopted in the next configuration period according to the detected configuration information.

The present disclosure will be further described below through the drawings and the specific embodiments in detail.

Figure 1:
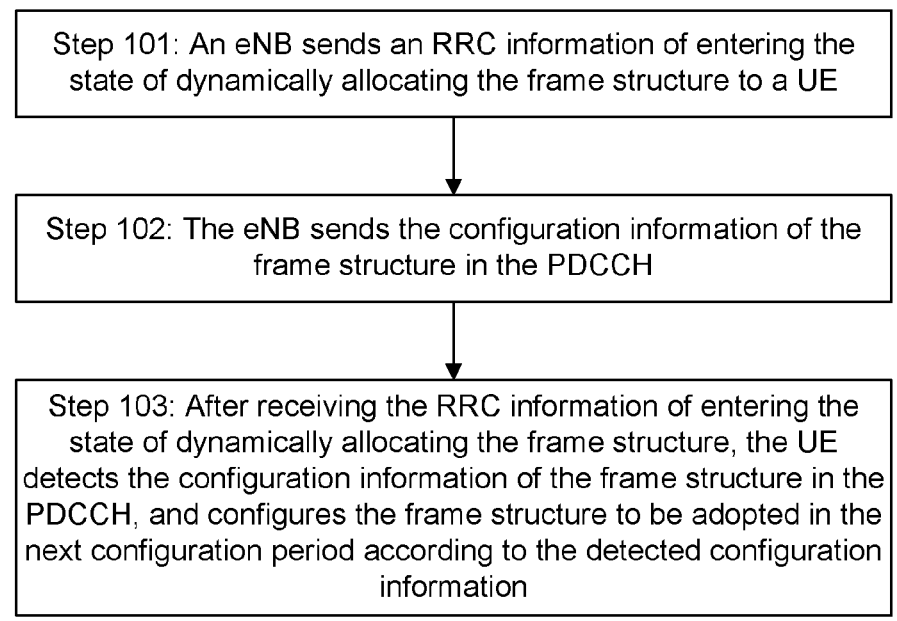
FIG. 1 illustrates a flow of a method for allocating a dynamic frame structure of a TDD system according to an embodiment of the present disclosure.

An embodiment of the present disclosure provides a method for allocating a dynamic frame structure of a TDD system. As shown in FIG. 1, the method includes the following steps:

Step 101: An eNB sends to a UE an RRC information of entering the state of dynamically allocating the frame structure.

In the Step, the RRC information is SIB information broadcast signaling or the RRC information dedicated to the UE; and the SIB information broadcast signaling or the RRC information dedicated to the UE carries an identifier or information of entering the state of dynamically allocating the frame structure predetermined by the UE.

The RRC information dedicated to the UE may be a configuration information of a Channel State Indicator-Reference Signal (CSI-RS) or a period information fed back by a CSI and the like.

Step 102: The eNB sends the configuration information of the frame structure in the PDCCH.

Specifically, the eNB reuses a DCI information bit of a PDCCH sub-frame, and sets the configuration information of the frame structure in the reused DCI information bit or a redefined DCI information bit.

Furthermore, the PDCCH for sending the configuration information of the frame structure may be located in a predefined downlink sub-frame, such as downlink sub-frame 5 or downlink sub-frame 8.

Figure 2:
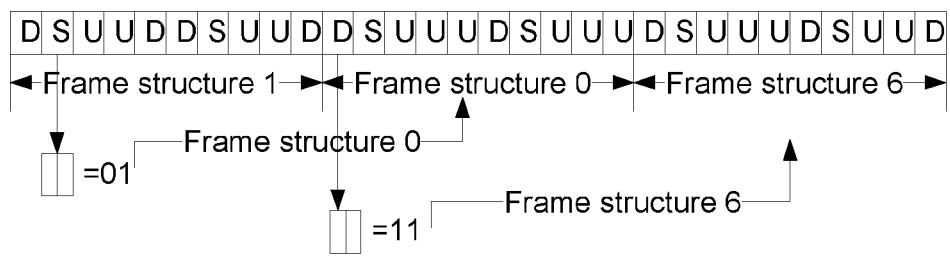
FIG. 2 is a diagram for dynamically indicating a Physical Uplink Shared Channel (PUSCH) frame structure of a UE according to an embodiment of the present disclosure.

The reused DCI information bit is usually a ULI bit or a DAI information bit, both of which are two bits. The configuration information of the frame structure set at the ULI bit or the DAI information bit is as shown in Table 2. For example, when the PUSCH frame structure of the UE is indicated, it is predefined that $V_{DAI}^{UL}=1$, and the eNB sets the ULI to 11, where $V_{DAI}^{UL}=1$ indicates that each Acknowledgement/Negative Acknowledgement (ACK/NACK) is only for one PUSCH; and ULI=11 indicates that the configuration information of the frame structure is 11. Specifically, as shown in FIG. 2, when the current PUSCH frame structure is frame structure 1, and the eNB sets, the DAI information bit of the second PDCCH sub-frame in frame structure 1 is set to 01, it is indicated that the PUSCH frame structure to be adopted in the next configuration period of the UE is frame structure 0; and when the PUSCH frame structure is frame structure 0, and the eNB sets the ULI bit of the first PDCCH sub-frame in frame structure 0 is set to 11, it is indicated that the PUSCH frame structure to be adopted in the next configuration period of the UE is frame structure 6.

Figure 3:
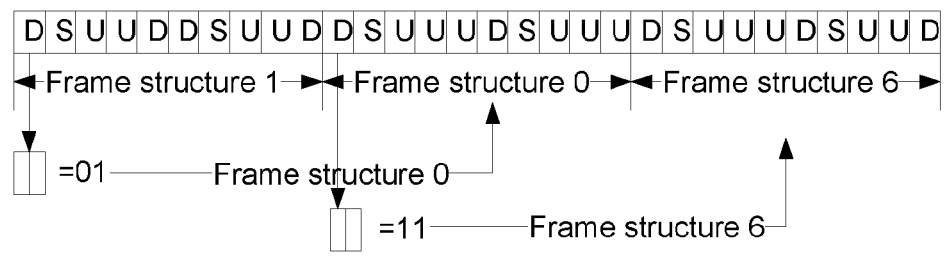
FIG. 3 is a diagram for dynamically indicating a PDCCH frame structure of a UE according to an embodiment of the present disclosure.

When the PDSCH frame structure of the UE is indicated, a DAI is set to 11 by the eNB, which indicates that the configuration information of the frame structure is 11. Specifically, as shown in FIG. 3, when the current PDSCH frame structure is frame structure 1 and the eNB sets the DAI information bit of the first PDCCH sub-frame in frame structure 1 to 01, it is indicated that the PDSCH frame structure to be adopted in the next configuration period of the UE is frame structure 0. When the PDSCH frame structure adopts frame structure 0 and the eNB sets the DAI information bit of the first PDCCH sub-frame in frame structure 0 to 11, it is indicated that the PDSCH frame structure to be adopted in the next configuration period of the UE is frame structure 6. Here, for the current frame structures 1-5, when continuous PDCCH sub-frames are allocated to one UE, the DAI information of any PDCCH sub-frame before the last PDCCH sub-frame is adopted to set the configuration information of the frame structure.

TABLE 2

| Current frame structure | Configuration information Switched frame structure | | | |
|---|---|---|---|---|
| | 00 | 01 | 10 | 11 |
| 0 | 0 | 1 | 2 | 6 |
| 1 | 1 | 0 | 2 | 6 |
| 2 | 2 | 0 | 1 | 6 |
| 6 | 6 | 0 | 1 | 2 |
| 3 | 3 | 0 | 4 | 5 |
| 4 | 4 | 3 | 5 | 6 |
| 5 | 5 | 0 | 3 | 4 |

It can be seen from Table 2, frame structures 0, 1, 2 and 6 can switch to one another; frame structures 3, 4 and 5 can switch to one another; frame structures 3, 4 and 5 can switch to frame structures 0, 1, 2 and 6 after being switched once or twice; whereas, frame structures 0, 1, 2 and 6 cannot switch to frame structures 3, 4 and 5.

The redefined DCI information bit is used for indicating the configuration information of the frame structure, may be as the same as DCI0/1/1A/1B/1D/2/2A/2B/2C in length and is generally placed in a PDCCH sub-frame location which is not compatible with the current 3GPP standard so as to distinguish a new DCI information bit from a traditional DCI information bit.

Figure 4:
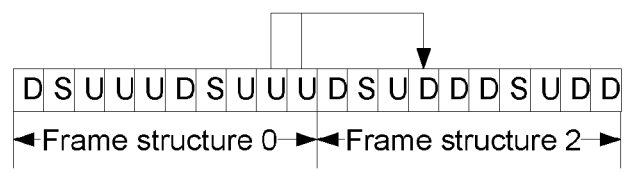
FIG. 4 is a diagram showing a frame structure when the frame structure switches from 0 to 2 in an embodiment of the present disclosure.

In this Step, the target switched frame structure of frame structure 0 needs to support twice the Physical Hybrid Repeat Indicator Channel (PHICH) resource groups. The target switched frame structure includes frame structures 1, 2 and 6. As shown in FIG. 4, when frame structure 0 switches to frame structure 2, the fourth sub-frame in frame structure 2 needs to support the sub-frames of twice PHICH resource groups.

Step 103: After receiving the RRC information of entering the state of dynamically allocating the frame structure, the UE detects the configuration information of the frame structure in the PDCCH, and allocates the frame structure to be adopted in the next configuration period according to the detected configuration information.

The method may further include that: the eNB sets the configuration information of the frame structure at two bits reserved for a Physical Broadcast Channel (PBCH). Thereby, the UE can acquire the frame structure to be adopted in the next configuration period quite early (before the demodulation of a PDCCH) without adding any redundant bit.

When the jump period of the frame structure is greater than 40 ms (integral multiple of 40 ms), the redundant bit transmitted for many times in the PBCH may be combined to set the configuration information of the frame structure to support the jump formats of more frame structures.

Figure 5:
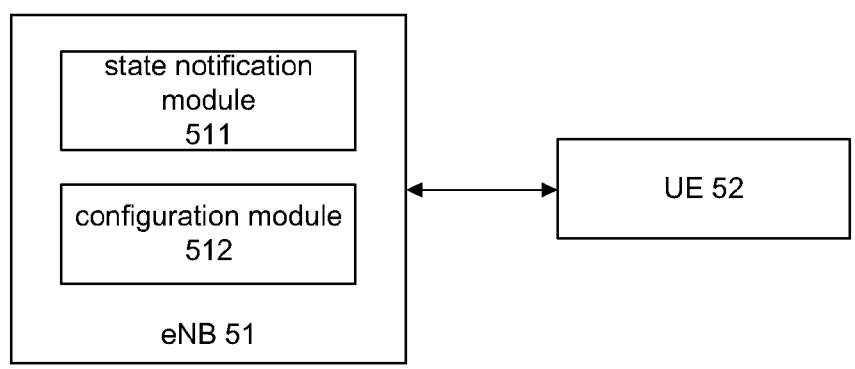
FIG. 5 is a diagram showing the structure of a system for allocating a dynamic frame structure of a TDD system according to an embodiment of the present disclosure.

In order to implement the method, an embodiment of the present disclosure may further provide a system for allocating a dynamic frame structure of a TDD system. As shown in FIG. 5, the system includes: an eNB 51 and a UE 52, wherein the eNB 51 is configured to send to the UE 52 an RRC information of entering the state of dynamically allocating the frame structure and sends the configuration information of the frame structure in a PDCCH; and the UE 52 is configured to, after receiving the RRC information, detect the configuration information of the frame structure in the PDCCH, and configure the frame structure to be adopted in the next configuration period according to the detected configuration information.

The eNB 51 includes: a state notification module 511 and a configuration module 512, wherein the state notification module 511 is configured to send an RRC information of entering the state of dynamically allocating the frame structure to the UE 52; and the configuration module 512 is configured to send the configuration information of the frame structure in the PDCCH.

The RRC information is SIB information broadcast signaling or a RRC information dedicated to the UE, which carries an identifier or information of entering the state of dynamically allocating the frame structure predetermined by the eNB 51 and the UE 52.

The configuration module 512 is specifically configured to reuse a DCI information bit and set the configuration information of the frame structure in the reused DCI information bit.

Generally, the reused DCI information bit is a reused ULI or DAI information bit, both of which are two bits; and the configuration information of the frame structure set at the ULI or DAI information bit is as shown in Table 2.

The configuration module 512 is specifically configured to redefine a DCI information bit and set the configuration information of the frame structure in the redefined DCI information bit.

The PDCCH for sending the configuration information of the frame structure may be located in a predefined downlink sub-frame, such as sub-frame 5 or sub-frame 8.

Based on the above system, the present disclosure may further provide an eNB. As shown in FIG. 5, the eNB 51 includes: a state notification module 511 and a configuration module 512, wherein the state notification module 511 is configured to send to the UE 52 an RRC information of entering the state of dynamically allocating the frame structure; and the configuration module 512 is configured to send the configuration information of the frame structure in a PDCCH.

The RRC information is SIB information broadcast signaling or a RRC information dedicated to the UE, which carries an identifier or information of entering the state of dynamically allocating the frame structure predetermined by the eNB 51 and the UE 52.

The configuration module 512 is specifically configured to reuse a DCI information bit and set the configuration information of the frame structure in the reused DCI information bit.

Generally, the reused DCI information bit is a reused ULI or DAI information bit, both of which are two bits, and the configuration information of the frame structure set at the ULI or DAI information bit is as shown in Table 2.

The configuration module 512 is specifically configured to redefine a DCI information bit and set the configuration information of the frame structure in the redefined DCI information bit.

The PDCCH for sending the configuration information of the frame structure may be located in a predefined downlink sub-frame, such as sub-frame 5 or sub-frame 8.

To sum up, the eNB sends the configuration information of the frame structure in the PDCCH and sends an RRC information of entering the state of dynamically allocating the frame structure to notify the UE; and the UE configures the frame structure to be adopted in the next configuration period according to the configuration information of the frame structure, thereby, the variation period of the frame structure of the TDD system can be shortened, and the transmission of asymmetrical service can be supported better.

The above are only the preferred embodiments of the present disclosure, and not intended to limit the scope of protection of claims of the present disclosure.

The invention claimed is:

1. A method for dynamically allocating a frame structure of a Time Division Duplexing (TDD) LTE system, comprising:

sending, by an Evolved NodeB (eNB), to a User Equipment (UE) a Radio Resource Control (RRC) information of entering a state of dynamically allocating the frame structure, and sending configuration information of the frame structure in a Physical Downlink Control Channel (PDCCH); and after the UE receives the RRC information, detecting, by the UE, the configuration information of the frame structure in the PDCCH, and configuring the frame structure to be adopted in the next configuration period according to the detected configuration information;

wherein the RRC information is System Information Block (SIB) information broadcast signaling or a RRC information dedicated to the UE; and the SIB information broadcast signaling or the RRC information dedicated to the UE carries an identifier or information of entering the state of dynamically allocating the frame structure predetermined by the eNB and the UE.

2. The method according to claim 1, wherein the step of sending, by the eNB, the configuration information of the frame structure in the PDCCH comprises:
reusing, by the eNB, a Downlink Control Information (DCI) bit, and setting the configuration information of the frame structure in the reused DCI information bit.

3. The method according to claim 1, wherein the step of sending, by the eNB, the configuration information of the frame structure in the PDCCH comprises:
redefining, by the eNB, a DCI information bit, and setting the configuration information of the frame structure in the redefined DCI information bit.

4. The method according to claim 1, wherein the PDCCH for sending the configuration information of the frame structure is located in a predefined downlink sub-frame.

5. The method according to claim 2, wherein the reused DCI information bit is a reused Uplink Index (ULI) bit or a Downlink Allocation Indicator (DAI) bit.

6. A system for dynamically allocating a frame structure of a Time Division Duplexing (TDD) LTE system, comprising: an Evolved NodeB (eNB) and a User Equipment (UE), wherein the eNB is configured to send to the UE a Radio Resource Control (RRC) information of entering the state of dynamically allocating the frame structure, and send the configuration information of the frame structure in a Physical Downlink Control Channel (PDCCH); and
the UE is configured to, after receiving the RRC information, detect the configuration information of the frame structure in the PDCCH, and configure the frame structure to be adopted in the next configuration period according to the detected configuration information;
wherein the RRC information is SIB information broadcast signaling or a RRC information dedicated to the UE; and the SIB information broadcast signaling or the RRC information dedicated to the UE carries an identifier or information of entering the state of dynamically allocating the frame structure predetermined by the eNB and the UE.

7. The system according to claim 6, wherein the eNB comprises: a memory storing instructions; and a processor executing the instructions to implement a state notification module and a configuration module;
the state notification module is configured to send to the UE the RRC information of entering the state of dynamically allocating the frame structure; and
the configuration module is configured to send the configuration information of the frame structure in the PDCCH.

8. The system according to claim 7, wherein the configuration module is configured to reuse a Downlink Control Information (DCI) bit and set the configuration information of the frame structure in the reused DCI information bit.

9. The system according to claim 7, wherein the PDCCH for sending the configuration information of the frame structure is located in a predefined downlink sub-frame.

10. The system according to claim 8, wherein the reused DCI information bit is a reused Uplink Index (ULI) or a Downlink Allocation Indicator (DAI) bit.

11. An Evolved NodeB (eNB), comprising: a memory storing instructions; and a processor executing the instructions to implement a state notification module and a configuration module, wherein
the state notification module is configured to send to a User Equipment (UE) a Radio Resource Control (RRC) information of entering the state of dynamically allocating the frame structure; and the configuration module is configured to send the configuration information of the frame structure in a Physical Downlink Control Channel (PDCCH); and
wherein the configuration module is configured to reuse a Downlink Control Information (DCI) bit and set the configuration information of the frame structure in the reused DCI information bit.

12. The eNB according to claim 11, wherein the PDCCH for sending the configuration information of the frame structure is located in a predefined downlink sub-frame.

13. The eNB according to claim 11, wherein the reused DCI information bit is a reused Uplink Index (ULI) or a Downlink Allocation Indicator (DAI) bit.

* * * * *